United States Patent

Rohrmoser et al.

[11] Patent Number: 6,162,002
[45] Date of Patent: Dec. 19, 2000

[54] FASTENING ELEMENT

[75] Inventors: Günter Rohrmoser, Meiningen, Austria; Roland Hasler, Vaduz, Liechtenstein; Reimund Schlosser, Feldkirch, Austria

[73] Assignee: Hilti Aktiengesellschaft, Schaan, Liechtenstein

[21] Appl. No.: 09/448,064

[22] Filed: Nov. 23, 1999

[30] Foreign Application Priority Data

Dec. 21, 1998 [DE] Germany .......................... 198 59 130

[51] Int. Cl.$^7$ ...................................................... F16B 15/00
[52] U.S. Cl. ............................................................. 411/441
[58] Field of Search ................................... 411/440, 441

[56] References Cited

U.S. PATENT DOCUMENTS 4,286,496  9/1981  Harris ...................................... 411/441
4,979,858  12/1990  Van Allman ............................. 411/441

FOREIGN PATENT DOCUMENTS 77949   6/1977   Australia ................................ 411/441
116182  2/1969   Norway .................................. 411/441
737968  10/1955  United Kingdom ..................... 411/441

*Primary Examiner*—Flemming Saether
*Attorney, Agent, or Firm*—Brown & Wood, LLP

[57] ABSTRACT

A fastening element including a spike (1) having a stem (2) and a head (3), and a guide member (4) including a substantially cylindrical base body (5) having a central bore (6), and a plurality of longitudinal ribs (7) which extend along an entire length of the base body (5), are uniformly distributed over a circumference of the base body (5), and project radially past an axial projection of a circumferential profile of the had (3) of the spike (1), with each of the plurality of longitudinal ribs (7) having at least one locking tongue (8) projecting beyond an envelope curve (H) formed by the plurality of longitudinal ribs (7).

7 Claims, 2 Drawing Sheets

FASTENING ELEMENT

BACKGROUND OF THE INVENTION

1. Field of the Invention

The present invention relates to a fastening element including a spike having a stem and a head, and a guide member including a substantially cylindrical base body having a central bore, and a plurality of longitudinal ribs which extend along an entire length of the base body, are uniformly distributed over a circumference of the base body, and project radially past an axial projection of a circumferential profile of the head of the spike.

2. Description of the Prior Art

German Patent No. 976,035 discloses a fastening element including a spike and a guide member that surrounds the spike stem. The guide member serves for axially aligning the spike in a corresponding receiving region of a setting tool. The guide member is formed as a substantially cylindrical body having a central bore and on a circumferential surface of which there are provided three, uniformly distributed, longitudinal ribs. The longitudinal ribs extend over the entire length of the base body and project radially beyond the outer circumference of a head provided at the free end of the spike.

Because the longitudinal ribs, which provide for a friction locking connection in the receiving region of the setting tool, extend over the entire length of the guide member, friction forces can be generated which are higher than the frictional force in the bore between the spike stem and the guide member. This results, upon driving of the spike in a hard structural component, e.g., in the displacement of the guide member along the spike stem and, as a result, in an unsatisfactory guidance of the fastening element in the receiving region of the setting tool. An unsatisfactory guidance of the fastening element in the receiving region of the setting tool can result in an unsatisfactory setting of the fastening element or in the damage of the setting tool.

Accordingly, an object of the present invention is to provide a fastening element which can insert in the receiving region of the setting tool with a small force.

Another object of the present invention is to provide a fastening element which could be reliably guided in the setting tool receiving region.

A further object of the present invention is to provide a fastening element which is ejected from the setting tool receiving region with a small force.

SUMMARY OF THE INVENTION

These and other objects of the present invention, which will become apparent hereinafter, are achieved by providing each of the longitudinal ribs with at least one locking tongue that projects beyond an envelope curve formed by the longitudinal ribs.

The guidance proper of the fastening element in the receiving region of the setting tool is insured by the longitudinal ribs. The locking tongues, which are provided on the longitudinal ribs, provide for securing the guide member in the receiving region of the setting tool. The locking tongues insure that the fastening element would not fall out of the receiving regions when the setting tool is held in a position in which the opening of the receiving region faces downward.

A large deformation of the locking tongues is prevented when, preferably, the locking tongues project radially past an envelope curve, which is formed by the longitudinal ribs by an amount from about 0.02 to about 0.09 of the diameter of the envelope curve.

The magnitude of the friction force acting between the setting tool receiving region and the locking tongues can be controlled by varying the length of extension of the locking tongues along the longitudinal ribs. Advantageously, the locking tongues extend only along a portion of the entire length of the base which forms the guide member.

Very good elastic characteristics of the locking tongues are achieved when they are arranged in respective recesses which are formed in the free regions of the longitudinal ribs and extend along the entire length of the longitudinal ribs.

In order to achieve an elastic connection between the longitudinal ribs and the base body, preferably, the outer contour of the cross-section of a longitudinal rib, which extends transverse to the longitudinal extent of the rib, widens to the rib free end. The smaller cross-section of the longitudinal rib in the circumferential region of the base body forms what can be called a pivot axis about which the longitudinal rib can pivot.

For manufacturing reasons, a surface, which contributes to the guidance of the spike, extends perpendicular to the bisectrice of an angle formed by two adjacent longitudinal ribs. These surfaces, the number of which correspond to the number of the longitudinal ribs, form parts of the inner profile of the central bore of the guide member. In the embodiment shown in the drawings, there are three longitudinal ribs which extend at the same angle to each other and, thus, there are formed three spike-guiding surfaces.

In order to be able to adapt the inner profile of the central bore to the profile of the spike stem, and to adapt the locking tongues to the receiving region of the setting tool, in which the fastening element is received, the guide member is advantageously formed of an elastic material.

The novel features of the present invention, which are considered as characteristic for the invention, are set forth in particular in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENT

Figure 1:
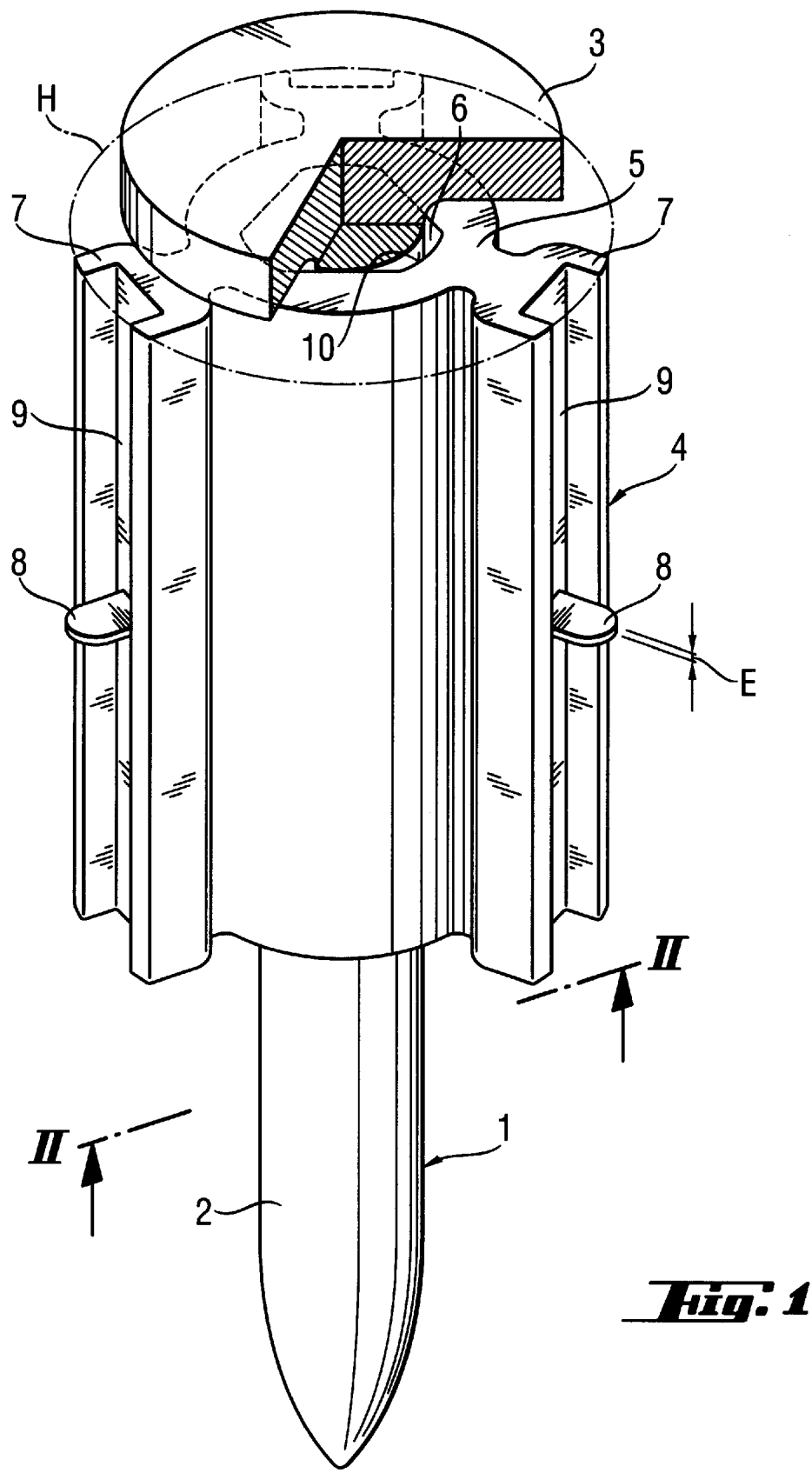
FIG. 1 a perspective view of a fastening element according to the present invention.
Figure 2:
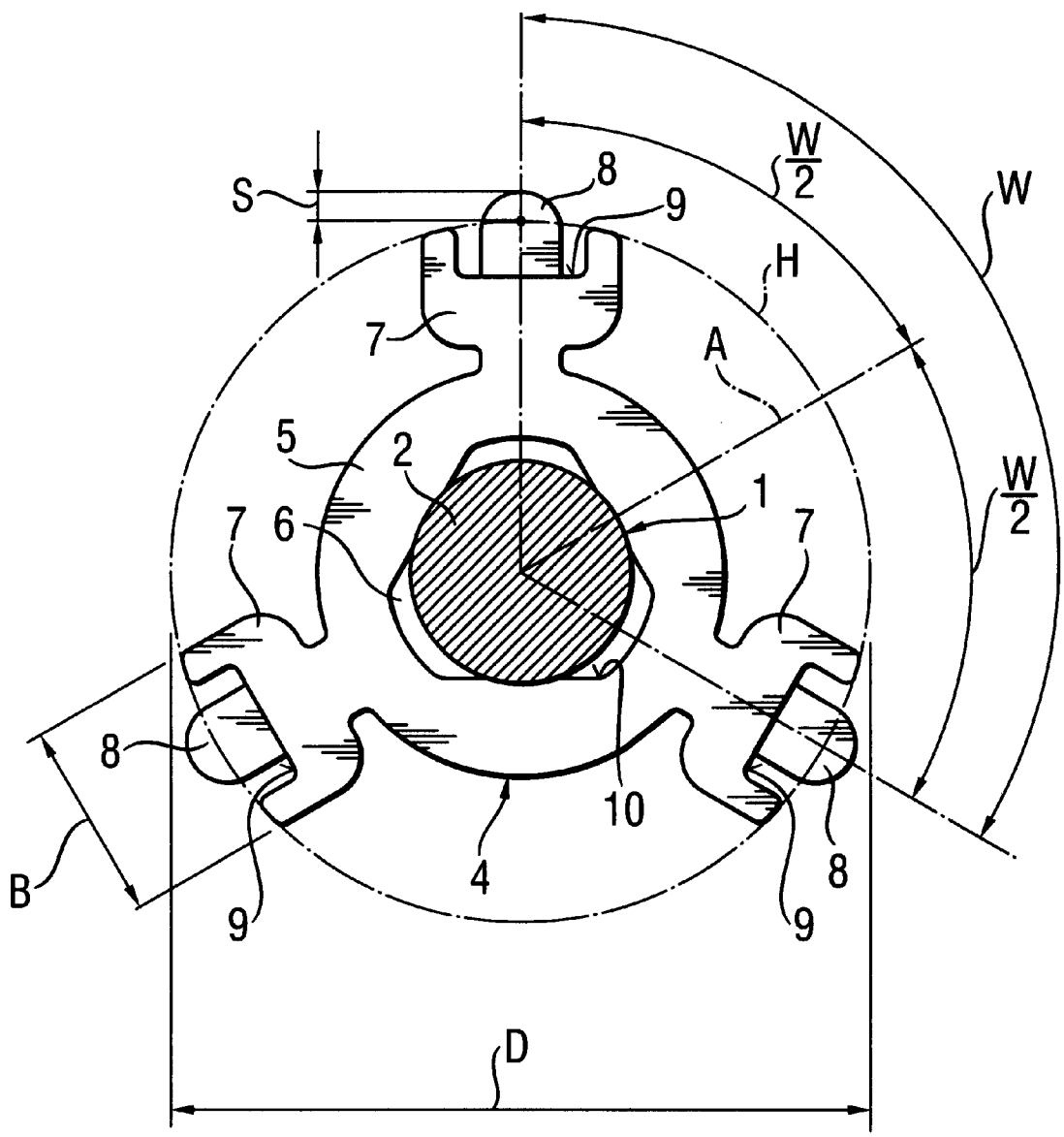
FIG. 2 a cross-sectional view of the fastening element shown in FIG. 1 along line II—II.

The fastening element according to the present invention, which is shown in FIGS. 1 and 2, is formed of a spike 1 and a guide member 4. The spike 1 has a stem 2 the free end of which facing in the fastening direction ends with a tip. At the opposite end of the spike 1, a head 3, which extends radially past the stem 2, is provided.

A guide member 4, which surrounds the stem 2 of the spike 1, is formed of a substantially cylindrical base body 5 on the circumference of which, there are provided three longitudinal ribs 7. The ribs 7 extend along the entire length of the base body 5 and are uniformly distributed on its circumference. The width B of the longitudinal ribs 7, measured in a direction transverse to the longitudinal extent of the base body 5, increases toward the free end of a rib 7. The guide member 4 has a central bore 6 which serves for receiving and guiding the spike 1.

Each of the longitudinal ribs 7 has, in its free end region, a recess 9 which extends over the entire length of the longitudinal rib 7. A locking tongue 8 is provided within each recess 9. The locking tongue 8 projects radially beyond the free end of a respective longitudinal rib 7. The extent E of the locking tongue 8 in a direction parallel to the longitudinal extent of the rib 7 corresponds to from about 0.02 to about 0.08 of the entire length of the base body 5. In the embodiment shown in the drawings, the extent of the locking tongue 8 corresponds to 0.02 of the longitudinal extent of the base body 5 or the rib 7. The locking tongue 8 projects beyond the envelope curve H by an amount corresponding to from about 0.02 to about 0.09 of a diameter D of the envelope curve H, as shown in FIG. 2.

Transverse to the axis A, which forms a bisectrix of an angle W between adjacent longitudinal ribs 7, a surface, which forms a portion of an inner contour 10 of the central bore 6 of the base body 5, extends. The inner contour or surface 10 has three such surfaces which are arranged relative to each other at the same angle. These surfaces provide for a friction locking connection of the guide member 4 with the stem 2 of the spike 1. An envelope curve, which is enclosed by these three surfaces, is somewhat smaller than the diameter of the stem 2 of the spike 1. The smaller dimension of the envelope curve insures a friction locking connection between the spike 1 and the elastic guide member 4 when the spike 1 extends through the central bore 6 of the guide member 4.

The head 3 of the spike 1 has an outer diameter which is smaller than the diameter 2 of the envelope curve formed by the free ends of the ribs 7, without the locking tongues 8.

Though the present invention has been shown and described with reference to a preferred embodiment, such is merely illustrative of the present invention and is not to be construed as a limitation thereof, and the present invention includes all modifications, variations and/or alternate embodiments within the spirit and scope of the present invention as defined by the appended claims.

What is claimed is:

1. A fastening element, comprising a spike (1) having a stem 92) and a head (3); and a guide member (4) including a substantially cylindrical base body (5) having a central bore (6), and a plurality of longitudinal ribs (7) which extend along an entire length of the base body (5), are uniformly distributed over a circumference of the base body (5), and project radially past an axial projection of a circumferential profile of the head (3) of the spike (1), each of the plurality of longitudinal ribs (7) having at least one locking tongue (8) projecting beyond an envelope curve (H) formed by the plurality of longitudinal ribs (7), wherein the locking tongue (8) is located in a recess formed in a respective longitudinal rib (7) extending over an entire length of the base body (5), and wherein the locking tongue (8) projects above a free end region of the longitudinal rib (7).

2. A fastening element according to claim 1 wherein the locking tongue (8) projects beyond the envelope curve (H) by an amount corresponding to from about 0.02 to about 0.09 of a diameter (D) of the envelope curve (H).

3. A fastening element according to claim 1, wherein the locking tongue (8) extends along a portion of the entire length of the base body (5).

4. A fastening element according to claim 3, wherein an extent of the locking tongue (8) along the base body (5) corresponds to from about 0.02 to about 0.08 of the entire length of the base body (5).

5. A fastening element according to claim 1, wherein an outer profile of a longitudinal rib (7) widens toward a free end thereof.

6. A fastening element according to claim 1, wherein a surface, which extends perpendicular to a bisectrix of an angle between two adjacent longitudinal ribs (7) forms part of an inner contour (10) of the central bore (6).

7. A fastening element according to claim 1, wherein the guide member is formed of an elastic material.

\* \* \* \* \*